(12) United States Patent
Holt et al.

(10) Patent No.: US 12,699,372 B2
(45) Date of Patent: Aug. 4, 2026

(54) UNIVERSAL MULTIMODAL PAYLOAD CONTROL

(71) Applicant: Tomahawk Robotics, Inc., Melbourne, FL (US)

(72) Inventors: Michael W. Holt, Smyrna, GA (US); William S. Bowman, Melbourne, FL (US); Matthew D. Summer, Melbourne, FL (US); Mark B. Moffett, Grant, FL (US)

(73) Assignee: Tomahawk Robotics, Inc., Melbourne, FL (US)

( * ) Notice: Subject to any disclaimer, the term of this patent is extended or adjusted under 35 U.S.C. 154(b) by 440 days.

(21) Appl. No.: 18/453,778

(22) Filed: Aug. 22, 2023

(65) Prior Publication Data

US 2025/0068134 A1 Feb. 27, 2025

(51) Int. Cl.
G05B 15/02 (2006.01)
G05D 1/00 (2006.01)

(52) U.S. Cl.
CPC .......... G05B 15/02 (2013.01); G05D 1/0094 (2013.01)

(58) Field of Classification Search
CPC .............................. G05B 15/02; G05D 1/0094
See application file for complete search history.

(56) References Cited

U.S. PATENT DOCUMENTS

| | | | | |
|---|---|---|---|---|
| 2008/0210025 A1* | 9/2008 | Goossen | .............. | F16M 11/123 |
| | | | | 74/5.34 |
| 2014/0110482 A1* | 4/2014 | Bay | .......................... | F41G 1/44 |
| | | | | 235/404 |
| 2018/0019802 A1* | 1/2018 | Teague | ................ | H04L 41/5022 |
| 2020/0192347 A1* | 6/2020 | Fenwick | .................. | H02H 9/02 |
| 2021/0339859 A1* | 11/2021 | Agostino | ................ | B64D 1/08 |
| 2023/0008140 A1* | 1/2023 | Raji | ...................... | F42C 15/42 |

FOREIGN PATENT DOCUMENTS

| | | | | |
|---|---|---|---|---|
| WO | WO-2022177759 A2 * | 8/2022 | .............. | F41A 17/06 |
| WO | 2025042854 A1 | 2/2025 | | |

* cited by examiner

*Primary Examiner* — Kito R Robinson
*Assistant Examiner* — Erin Marie Hartmann
(74) *Attorney, Agent, or Firm* — Ashurst Perkins Coie US LLP

(57) ABSTRACT

Methods and systems are described herein for a payload management system that may detect that a payload has been attached to an uncrewed vehicle and determine whether the payload is a restricted payload or an unrestricted payload. Based on determining that the payload is an unrestricted payload, the payload management system may establish a connection between the payload and the operator using a first communication channel that has already been established between the uncrewed vehicle and the operator. Based on determining that the payload is a restricted payload, the payload management system may establish a connection between the payload and operator using a second communication channel. The payload management system may listen for restricted payload commands over the second communication channel, and when a payload command is received via the second communication channel, the payload command may be executed using the restricted payload.

20 Claims, 6 Drawing Sheets

100

100

_600_

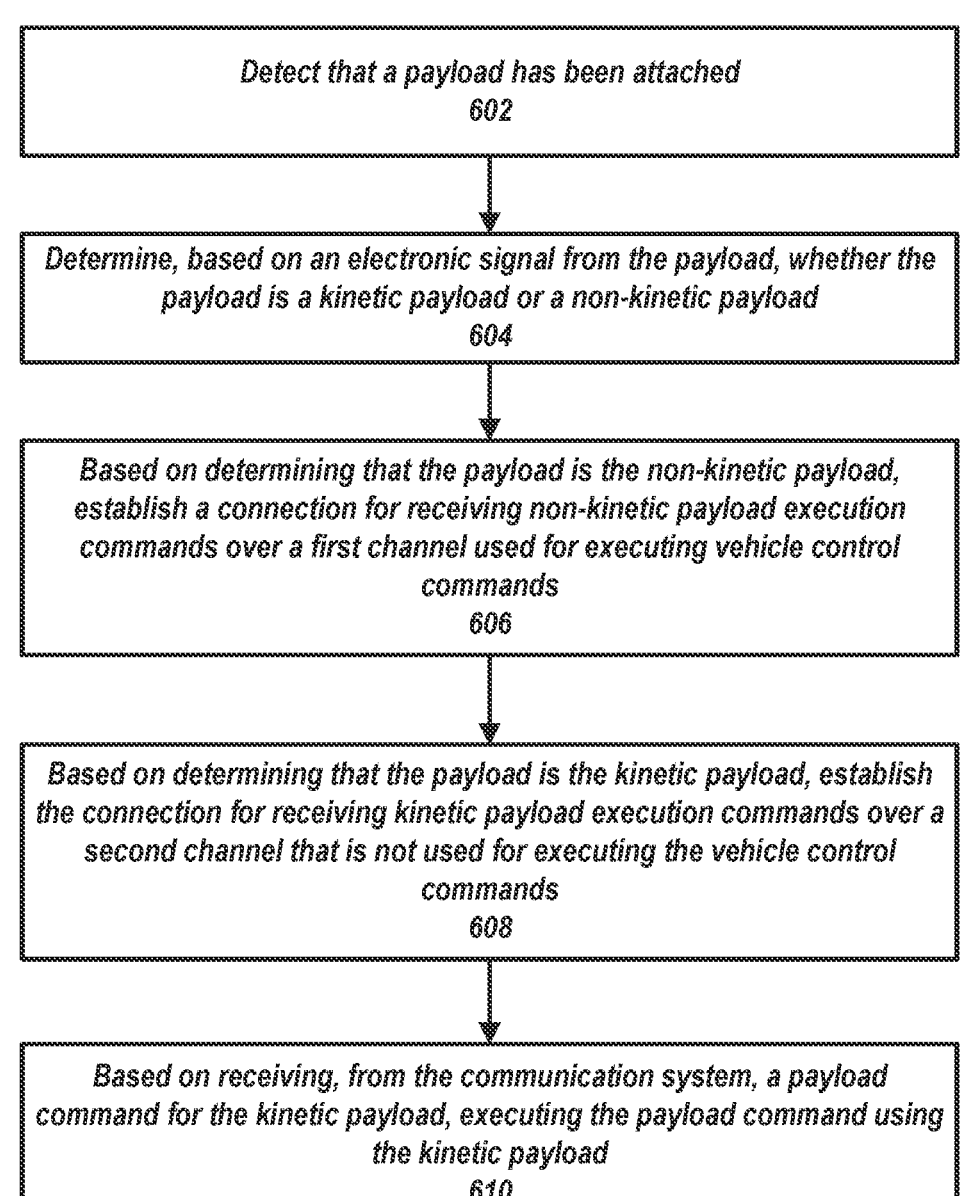

Detect that a payload has been attached
602

Determine, based on an electronic signal from the payload, whether the payload is a kinetic payload or a non-kinetic payload
604

Based on determining that the payload is the non-kinetic payload, establish a connection for receiving non-kinetic payload execution commands over a first channel used for executing vehicle control commands
606

Based on determining that the payload is the kinetic payload, establish the connection for receiving kinetic payload execution commands over a second channel that is not used for executing the vehicle control commands
608

Based on receiving, from the communication system, a payload command for the kinetic payload, executing the payload command using the kinetic payload
610

FIG. 6

UNIVERSAL MULTIMODAL PAYLOAD CONTROL

BACKGROUND

Stable and reliable robotic systems are becoming increasingly common, which has contributed to the recent advancement and proliferation of uncrewed system technologies. In many instances, these systems are equipped with one or more payloads. Some uncrewed vehicles may carry unrestricted payloads such as non-kinetic payloads, including gimbals, cameras, and/or other sensor packages, while other uncrewed vehicles may carry restricted payloads such as kinetic payloads including projectiles and other suitable kinetic packages. Yet some uncrewed vehicles may carry both types of payloads. Extra care must be taken when uncrewed vehicles are equipped with restricted payloads (e.g., kinetic payloads) or a combination of restricted and non-restricted payloads so that those restricted payloads are not released or activated accidentally or purposefully by bad actors. At the same time, it is desirable to be able to activate restricted payloads (e.g., release kinetic payloads) quickly and efficiently when needed.

SUMMARY

Therefore, methods and systems are described herein for a multimodal payload control mechanism. There are various requirements for using restricted (e.g., kinetic) payloads in uncrewed vehicles. One of the requirements is that a restricted (e.g., kinetic) payload is not allowed to be electrically connected to vehicle controls. Thus, restricted payloads are not allowed to draw power and use data connections established by the uncrewed vehicle to the operator. However, unrestricted (e.g., non-kinetic payloads) do not have these restrictions. Thus, it is desirable to be able for a payload (e.g., a camera or another sensor package) to use power and a communication channel already established between the uncrewed vehicle and an operator. Accordingly, a mechanism is desired that would enable an uncrewed vehicle to automatically configure itself to be able to handle a restricted payload and a non-restricted payload. In addition, it would be desired for an uncrewed vehicle to configure itself to handle both types of payloads while following the requirements for restricted (e.g., kinetic) payloads.

Therefore, an uncrewed vehicle may be equipped with a payload management system. The payload management system may detect that a payload has been attached to an uncrewed vehicle and determine whether the payload is a restricted (e.g., kinetic) payload or an unrestricted (e.g., non-kinetic) payload. Based on determining that the payload is an unrestricted (e.g., non-kinetic) payload, the payload management system may establish a connection between the payload and the operator using a first communication channel that has already been established between the uncrewed vehicle on the operator. Based on determining that the payload is a restricted (e.g., kinetic) payload, the payload management system may establish a connection between the payload and operator using a second communication channel. The payload management system may listen for restricted (e.g., kinetic) payload commands over the second communication channel, and when a payload command is received via the second communication channel, the payload command may be executed using the restricted (e.g., kinetic) payload.

In some embodiments, the payload management system may perform the following operations when controlling uncrewed vehicle payloads. The payload management system may detect, using a payload controller, that a payload has been attached to an uncrewed vehicle. The payload may include additional equipment carried by the uncrewed vehicle. For example, the payload management system may detect that a payload device has been plugged into the uncrewed vehicle. The payload may include equipment such as a gimbal, a camera, and/or other type of payload. In some embodiments, the payload may be a weapon (e.g., an explosive device, a projectile weapon, or another suitable weapon).

The payload management system may then determine, based on a signal from the payload, whether the payload is a restricted payload or an unrestricted payload. For example, when the payload is detected by the payload management system, the payload management system may receive a signal indicating that the payload is now connected. The signal may indicate whether the payload is a restricted (e.g., kinetic) payload or an unrestricted (e.g., non-kinetic) payload. In some embodiments, the restricted payload may include a projectile mechanism and the non-restricted payload may include a non-projectile mechanism such as a sensor package or another suitable mechanism.

In some embodiments, the payload management system may receive the signal via a physical switch (e.g., a solenoid switch). The signal may be an electronic signal generated using power from a first power source associated with the uncrewed vehicle and not from a second power source associated with the payload controller. For example, an unrestricted payload may form a connection between the electronics within the uncrewed vehicle and the payload management system. The connection may bring power and/or or data from the uncrewed vehicle. However, a restricted payload may not form the connection and the power may come from a power source associated with the payload management system. Accordingly, there may be a lack of signal from the uncrewed vehicle, which may cause the payload management system to determine that the payload is a restricted payload. In some embodiments, instead of or in addition to using a solenoid switch, the payload management system may use an optical switch.

In some embodiments, when the payload is attached to the uncrewed vehicle (e.g., inserted into a payload slot or attached using another mechanism), the attachment may cause the payload to engage one or more physical switches. Those switches may cause the payload management system to determine a payload type associated with the attached payload. For example, if a particular switch is engaged, the payload may be a restricted payload and if another switch is engaged the payload may be an unrestricted payload.

In some embodiments, the payload management system may use metal pins for payload connections and one or more of the pins may be used to determine whether the payload is restricted (e.g., kinetic) or unrestricted (e.g., non-kinetic). For example, if a particular pin provides an electric signal (e.g., the pin is connected), the payload management system may determine that the payload is non-kinetic. However, if the pin is not connected, the payload management system may determine that the payload is kinetic. The pin may be a pin that brings power from the uncrewed vehicle through the payload. The pin or another pin may be a pin that brings data from the uncrewed vehicle through the payload. That is, if there is an electrical signal through the pin, the payload is non-kinetic, but if there is no electric signal through the pin, the payload is kinetic.

The payload management system may configure the payload in different ways based on whether the payload is a restricted payload or an unrestricted payload. In particular, the payload management system may, based on determining that the payload is the unrestricted payload, generate and provide, to a communication system associated with the uncrewed vehicle, a first command to establish a connection for receiving unrestricted payload execution commands over a first channel used for executing vehicle control commands. For example, the payload management system may use the same radio and/or radio frequencies to communicate with the operator to execute commands using the unrestricted payload.

If the payload is kinetic, the payload management system may configure the communications differently. In particular, in response to determining that the payload is the restricted payload, the payload management system may generate and provide, to the communication system associated with the uncrewed vehicle, a second command to establish the connection for receiving restricted payload execution commands over a second channel that is not used for executing the vehicle control commands. For example, the payload management system may use a different radio to communicate with the operator for commands that must be executed by the restricted payload (e.g., release commands, firing commands, etc.). In some embodiments, the payload management system may receive from the communication system an indication that a connection has been established.

When the payload management system configures the payload based on the payload being kinetic or non-kinetic, the payload management system may process commands for that payload. In particular, based on receiving from the communication system a payload command for the restricted payload, the payload management system may execute the payload command using the restricted payload. For example, for a restricted payload, the payload management system may instruct a motor controller to initiate a firing sequence, release the payload, and/or perform another command.

Various other aspects, features and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 6 is a flowchart of operations for a multimodal payload control mechanism, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
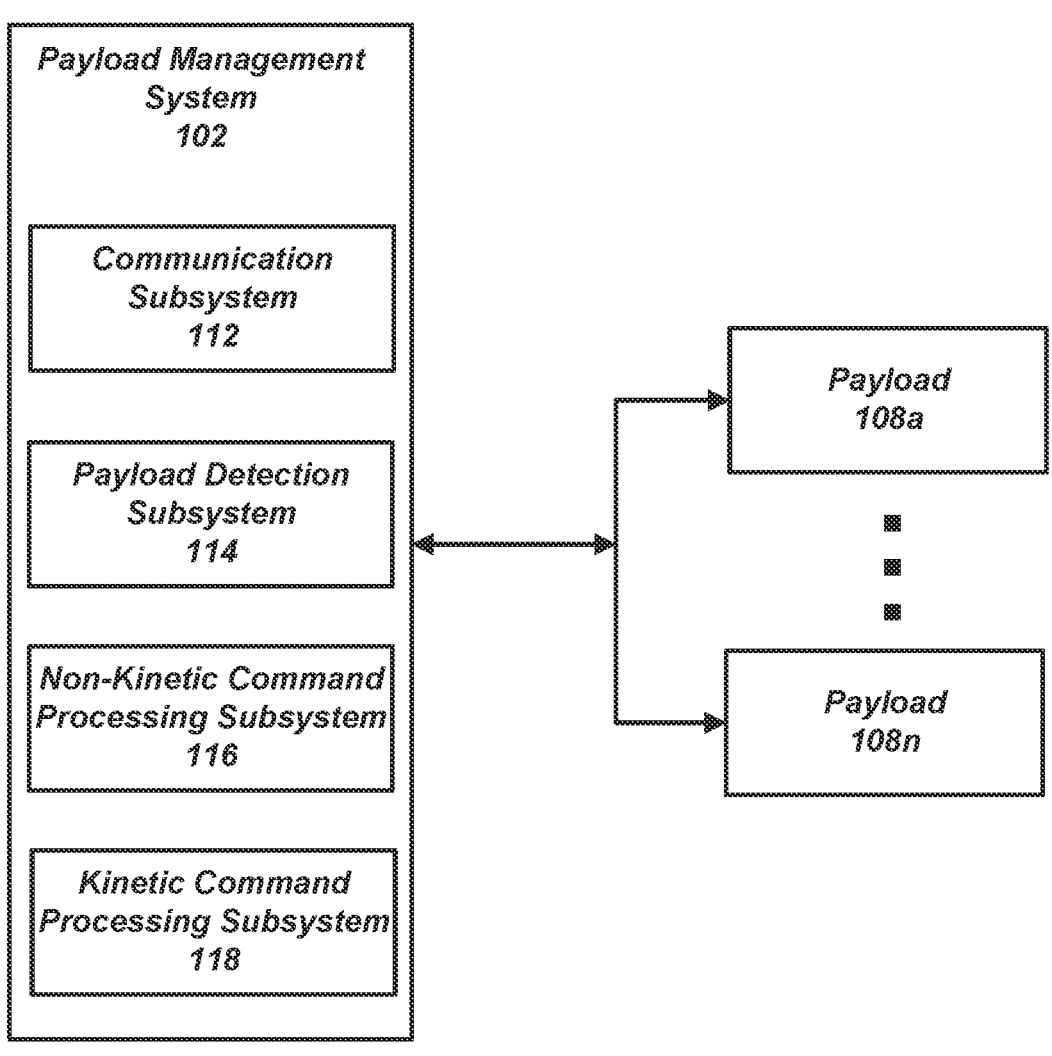
FIG. 1 shows an illustrative system for automatically configuring uncrewed vehicle payloads, in accordance with one or more embodiments of this disclosure.

FIG. 1 is an example of environment 100 for automatically configuring and managing payloads for uncrewed vehicles. Although the examples in this disclosure are related to uncrewed vehicles, the disclosed processes may be used on manned vehicles. Environment 100 includes payload management system 102 and payloads 108a-108n. Payload management system 102 may execute instructions for automatically configuring and managing payloads for vehicles. Payload management system 102 may include software, hardware, or a combination of the two. In some embodiments, uncrewed vehicles may include unnamed aerial vehicles (UAVs) such as copters, fixed wing drones, and others. In addition, uncrewed vehicles may include uncrewed land vehicles and/or uncrewed watercraft. Payloads 108a-108n may be devices attached to uncrewed vehicles and may include unrestricted payloads such as video cameras, infrared cameras, microphones, thermal imaging devices, and/or other suitable devices. Restricted payloads may include projectile weapons such as guns, explosive ordnance, etc. Although this disclosure will describe payloads as being kinetic or non-kinetic, the same operations may be executed for payloads that are restricted or unrestricted. For example, a restricted payload may be a kinetic payload, a chemical payload, a laser payload, or another type of restricted payload. An unrestricted payload may be a camera, or another type of unrestricted payload. In some embodiments, any payload may be designated as a restricted payload or an unrestricted payload.

Payload management system 102 may detect, using a payload controller, that a payload has been attached to an uncrewed vehicle. Payload management system 102 may perform the detection using payload detection subsystem 114. Payload detection subsystem 114 may include software components, hardware components, or a combination of both. As referred to herein, the term "payload" may refer to additional equipment carried by the uncrewed vehicle. In some embodiments, a payload controller may be a microcontroller that is a combination of software and hardware. The payload controller may host payload management system 102 and payload detection subsystem 114. A particular payload may include one or more electronic components for connecting to the payload management system. When the payload is connected, an electronic signal may be generated and sent to the payload controller. The payload controller may receive the electronic signal and determine, based on the received electronic signal, that a payload has been connected.

In some embodiments, the payload may be inserted into a specific slot on an uncrewed vehicle. For example, an uncrewed vehicle may have multiple slots for inserting payloads. Thus, an operator may insert the payload into a particular slot which may be managed by a payload controller. The payload may include an electronic connection that may electronically connect the payload with a payload controller. In some embodiments, the electronic connection may be one or more pinouts that may function for power and/or data connection to the payload controller. In some embodiments, the connection may be through a solenoid switch or an optical coupler. When the payload is inserted, the electronic connection may be initiated (e.g., by completing a circuit).

When payload detection subsystem 114 detects that a payload has been connected, payload detection subsystem 114 may determine, based on receiving a signal associated with the payload, whether the payload is a restricted payload or an unrestricted payload. In some embodiments, a restricted payload may be a kinetic payload that may include a projectile mechanism and the unrestricted payload may be a non-kinetic payload that may include a non-projectile mechanism. In one example, payload detection subsystem 114 may determine whether the payload is kinetic and non-kinetic based on a presence of an air gap between components of the uncrewed vehicle and components associated with the payload. If, when a particular payload is inserted into the uncrewed vehicle an air gap is present (e.g., there is no electronic connection between the electronic components associated with the payload and electronic components of the uncrewed vehicle), payload detection subsystem 114 may determine that the payload is kinetic. However, if, when the particular payload is inserted into the uncrewed vehicle an air gap is not present (e.g., there is an electronic connection between the electronic components associated with the payload and the electronic components of the uncrewed vehicle), payload detection subsystem 114 may determine that the particular payload is an unrestricted payload.

Figure 2:
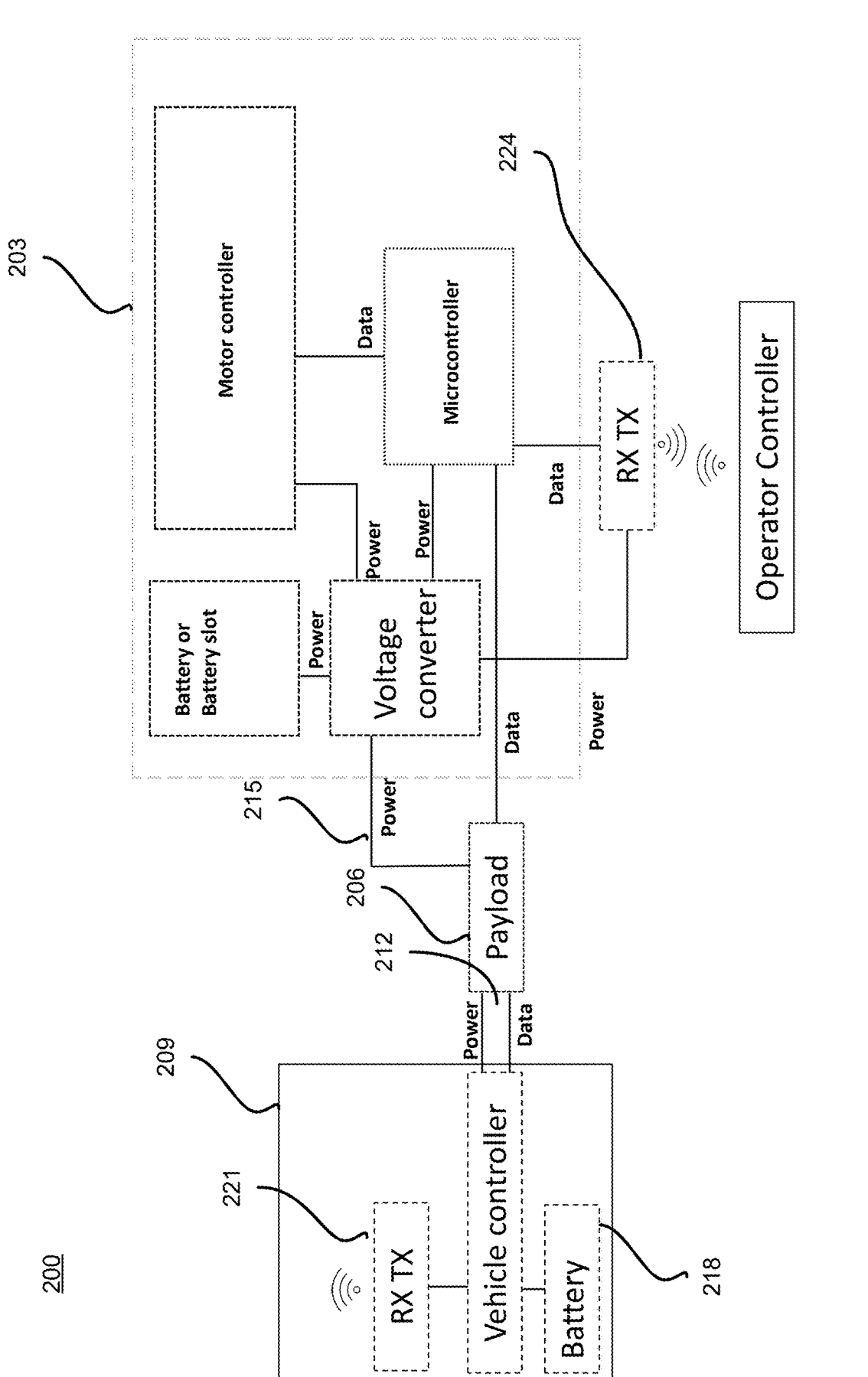
FIG. 2 illustrates a diagram for a connection of an unrestricted payload, in accordance with one or more embodiments of this disclosure.

FIG. 2 illustrates a diagram 200 for a connection of an unrestricted payload. Payload controller 203 may be a controller associated with a payload or a payload slot mounted on an uncrewed vehicle 209. When no payload is connected to payload controller 203 or inserted into a payload slot (now shown) associated with payload controller 203, payload controller 203 is not electronically connected to other electronics within the uncrewed vehicle 209. For example, payload controller 203 (as shown in FIG. 2) may have its own power source (e.g., a battery), its own radio, its own microcontroller and/or other components. Those components may be electrically and electronically isolated from the rest of the electronic components onboard the uncrewed vehicle.

FIG. 2 also illustrates payload 206 connected to the uncrewed vehicle. The connection may be an electronic connection. In some embodiments, payload may be inserted into the uncrewed vehicle and, if the payload is an unrestricted payload (e.g., non-kinetic payload), the payload may bridge the electronic components of uncrewed vehicle 209 and the electronic components of payload controller 203. For example, an unrestricted payload may bridge (e.g., link) power and data connections 212 with power and data connections 215.

In some embodiments, payload controller 203 may (e.g., via a microcontroller) determine whether the payload is kinetic or non-kinetic using a physical switch (e.g., a solenoid switch). Thus, when a payload is connected to an uncrewed vehicle (e.g., the payload is inserted into an uncrewed vehicle), the payload controller may receive an electronic signal via a solenoid switch. The electronic signal may be generated using power from a first power source associated with the uncrewed vehicle and not from a second power source associated with the payload controller. For example, the electronic signal may be generated via the vehicle controller using power source 218 and sent by the vehicle controller through payload 206 to the microcontroller. The electronic signal may be sent by payload 206 completing a circuit. The microcontroller of payload controller 203 may receive the electronic signal and, based on the electronic signal being generated using the first power source, determine that the payload is the unrestricted payload (e.g., a non-kinetic payload). That is, if the payload bridges (e.g., creates an electronic connection) the vehicle controller and payload controller 203, payload detection subsystem 114 may determine that the payload is non-kinetic.

Figure 3:
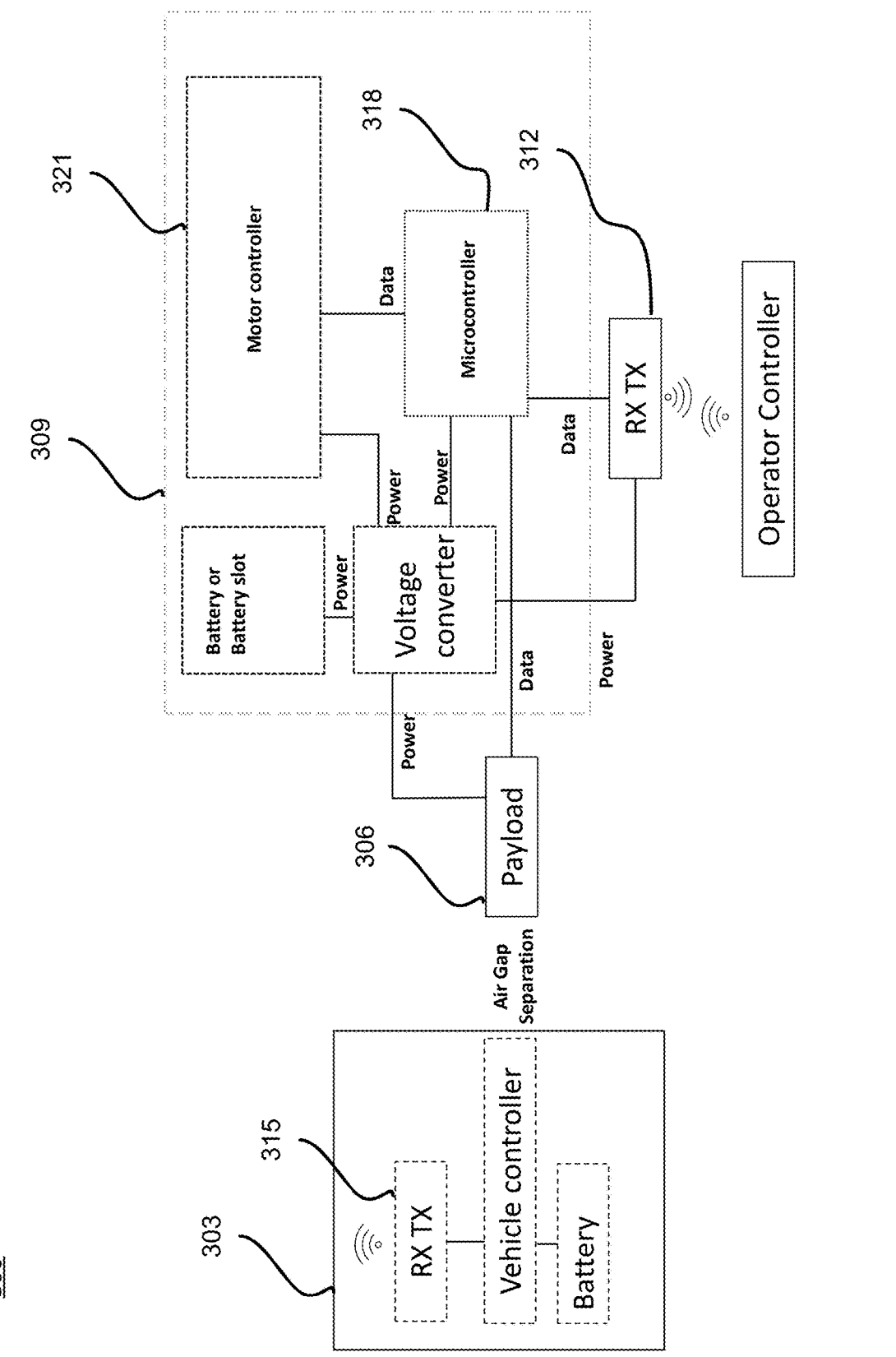
FIG. 3 illustrates a diagram for a connection of a restricted payload, in accordance with one or more embodiments of this disclosure.

In some embodiments, payload detection subsystem 114 may determine that the payload is kinetic based on lack of signal via a mechanical switch (e.g., a solenoid switch). In particular, payload detection subsystem 114 may receive no electronic signal via a solenoid switch. For example, payload detection subsystem 114 may detect that a payload was connected to the payload controller (e.g., via an electronic connection). However, payload detection subsystem 114 may determine that there is no electronic connection from the uncrewed vehicle (e.g., via a solenoid switch or another mechanical switch). Thus, based on lack of the electronic signal being received via the solenoid switch, payload detection subsystem 114 may determine that the payload is the restricted payload (e.g., a kinetic payload). That is, payload detection subsystem 114 may determine that there is an air gap between the payload and the other electronics of the uncrewed vehicle (e.g., vehicle controller, vehicle radio and vehicle power source). FIG. 3 illustrates diagram 300 for a connection of a restricted payload. Uncrewed vehicle 303 is shown as not connected to payload controller 309 via payload 306. That is, there is an air gap between the vehicle controller and the combination of the payload and the payload controller, which are electrically and electronically isolated from the uncrewed vehicle.

In some embodiments, payload detection subsystem 114 may use one or more mechanical switches to determine whether a payload is restricted (e.g., kinetic) or unrestricted (e.g., non-kinetic). For example, when the payload is attached to the uncrewed vehicle (e.g., inserted into a payload slot or attached using another mechanism), the attachment may cause the payload to engage one or more mechanical switches. Those switches may cause the payload management system to determine a payload type associated with the attached payload. The system may include one or more switches. For example, the system may include one mechanical switch that when engaged indicates that an unrestricted payload has been attached. In some embodiments, the physical switch may open or close a circuit indicating that the payload is unrestricted or restricted. In another example, the system may use two mechanical switches. For example, if a first mechanical switch is engaged (e.g., by attaching the payload), the payload may be a restricted payload and if a second mechanical switch is engaged, the payload may be an unrestricted payload. If both switches are engaged, the system may generate an error condition. In some embodiments, a third mechanical switch may be engaged that indicates that a payload is attached. Accordingly, if the third mechanical switch is engaged and none of the first and the second switch are engaged, the system may generate an error condition.

In some embodiments, payload detection subsystem 114 may use electronic pins for determining whether a payload is kinetic or non-kinetic. In some embodiments, payload detection subsystem 114 may receive the electronic signal via a pin of a plurality of pins. The plurality of pins may be used for power transfer and signal transfer between the payload controller and the uncrewed vehicle. The particular pin may be preconfigured for use with unrestricted payloads. For example, when a payload is connected to an uncrewed vehicle (e.g., inserted into a payload slot), the payload may be connected via a plurality of pins. That is, the payload controller may be outfitted with a first plurality of pins and the payload may be outfitted with a second plurality of pins. Each pin within the first plurality of pins may be electrically connected to a corresponding pin within the second plurality of pins when the payload is connected to (e.g., inserted into) the uncrewed vehicle. Furthermore, the uncrewed vehicle itself may have a number of pins (e.g., for power and data to be shared with the payload). If the payload is an unrestricted payload (e.g., a kinetic payload), that payload may have pins that match the pins associated with the uncrewed vehicle. Thus, unrestricted payloads may bridge (e.g., using corresponding pins) the payload controller (e.g., payload controller 203) and the other electronic components of the uncrewed vehicle (e.g., uncrewed vehicle 209). As a result, the payload controller (e.g., via the microcontroller) would detect an electric/electronic signal from the uncrewed vehicle for unrestricted payloads.

However, restricted payloads may not have pins for connecting with the uncrewed vehicle and would not bridge such a connection. Accordingly, based on the electronic signal received via the pin of the plurality of pins, payload detection subsystem 114 may determine that the payload is the unrestricted payload. Furthermore, based on the electronic signal not being received via a preconfigured pin, payload detection subsystem 114 may determine that the payload is kinetic.

When payload detection subsystem 114 determines the type of payload that is connected, payload detection subsystem 114 may perform various operations. In particular, if payload detection subsystem 114 detects an unrestricted payload (e.g., a non-kinetic payload), payload detection subsystem 114 may configure the payload controller (e.g., payload controller 203) to draw power from the power source associated with the uncrewed vehicle. Furthermore, payload detection subsystem 114 may configure the payload controller (e.g., payload controller 203) to use a communication system associated with the uncrewed vehicle to receive payload commands from an operator. That is, in response to determining that the payload is the unrestricted payload, payload detection subsystem 114 may establish a connection for receiving unrestricted payload execution commands over a first channel that is used for executing vehicle control commands. As referred to herein, the term unrestricted payload execution command refers to a command to be executed by a payload, such as the command does not activate a weapon (e.g., a projectile weapon, an explosive weapon, etc.). For example, unrestricted payload execution command may be a command to pivot a gimbal, capture an image with a camera, or another suitable command.

In some embodiments, payload detection subsystem 114 may configure the payload controller to use a radio (e.g., radio 221) associated with the uncrewed vehicle to control the payload. For example, if the payload is a gimbal with a camera, payload detection subsystem 114 may configure the payload controller to receive unrestricted payload commands through radio 221. In some embodiments, payload detection subsystem 114 may disable (e.g., temporarily) the radio associated with the payload controller (e.g., radio 224) to preserve power source power. Thus, radio 221 may be used to receive both vehicle control commands (e.g., movement commands) and payload commands over the same radio. In some embodiments, both vehicle control commands and payload commands may be received over the same channel or channels of the radio (e.g., radio 221).

In some embodiments, in response to determining that the payload is the unrestricted payload (e.g., non-kinetic payload), payload detection subsystem 114 may (e.g., via a microcontroller associated with the payload controller) generate and provide, to a communication system associated with the uncrewed vehicle, a first command to establish a connection for receiving unrestricted payload execution commands over a first channel used for executing vehicle control commands. For example, the vehicle controller may store and execute an operating system (e.g., being executed by one or more processors) that may interface with an onboard radio (e.g., radio 221). The operating system may use the radio to receive commands and send data (e.g., telemetry data) from the uncrewed vehicle to the operator. The communication system may be communication subsystem 112 illustrated in FIG. 1. Communication subsystem 112 may include software components, hardware components, or a combination of both. For example, communication subsystem 112 may include a network interface card (e.g., for interfacing with a radio) that is coupled with software to drive the card/processor.

In some embodiments, communication subsystem 112 may be configured to receive payload commands over the radio (e.g., radio 221) and then pass those payload commands to payload controller 203. That is, communication subsystem 112 may determine whether a command is a payload command or a vehicle command (e.g., a maneuvering command). In one example, communication subsystem 112 may make the determination based on, for example, a table of commands stored in memory. For example, when a payload detection subsystem 114 configures the uncrewed vehicle for an unrestricted payload (e.g., via the first payload command), payload detection subsystem 114 may send a list of payload commands to communication subsystem 112. Thus, when communication subsystem 112 receives a command from the radio (e.g., transmitted by the operator), communication subsystem 112 may perform a lookup and determine that the received command is a payload command. Communication subsystem 112 may then send that payload command to the payload controller for execution via the payload.

The payload controller may receive the unrestricted payload command (e.g., a non-kinetic payload command) and may process that command via unrestricted command processing subsystem 116. Unrestricted command processing subsystem 116 may include software components, hardware components, or a combination of both. For example, unrestricted command processing subsystem 116 may include software components that access data in memory and/or storage and may use one or more processors to perform its operations. Unrestricted command processing subsystem 116 may be hosted on the payload controller as part of payload management system 102. For example, when the payload controller receives the command, the payload controller may use one or more processors to execute one or more application programming interfaces associated with unrestricted command processing subsystem 116.

In some embodiments, the unrestricted payload may be a combination of a gimbal and a camera. An operator may use a handheld device to send a command to the uncrewed vehicle to pivot a camera to a different orientation. As the gimbal/camera combination is an unrestricted payload, communications with the operator may be routed through the uncrewed vehicle. Thus, the command from the operator may be received by a radio associated with the vehicle control (e.g., radio 221) using communication subsystem 112. Communication subsystem 112 may determine (e.g., based on a command table discussed above) that the command is for the payload and may route that command to the payload controller (e.g., payload controller 203). The payload controller may receive the command via a microcontroller and may execute the command (e.g., via a motor controller) to pivot the gimbal according to the command. An operator may then send another command (e.g., to the camera to record an image). The system may perform similar operations to route the command to the payload. Once the image is recorded, the image may be sent to the operator through the payload controller to the vehicle controller and the radio.

As discussed above, payload management system 102 may also support restricted payloads. Thus, in response to determining that the payload is the restricted payload, payload detection subsystem 114 may establish a connection for receiving restricted payload execution commands over a second channel that is not used for executing the vehicle control commands. Furthermore, payload detection subsystem 114 may configure the payload controller to draw power from power source internal to the payload controller. As referred to herein, the term restricted payload execution command refers to a command to be executed by a payload such as the command that activates a weapon (e.g., a projectile weapon, an explosive weapon, etc.). For example, a restricted payload execution command may be a command to fire a weapon, drop a munition, or another suitable command.

In some embodiments, payload detection subsystem 114 may configure a second radio (e.g., radio 312) as the second channel for receiving restricted payload execution commands (e.g., from an operator). Payload detection subsystem 114 may detect, within the communication system, a first communication device and a second communication device attached to the uncrewed vehicle. The first communication device may be used for vehicle control. For example, the communication system may detect communication subsystem 112 residing on payload controller 309. Thus, communication subsystem 112 may detect radio 312 and radio 315. Communication subsystem 112 may determine that radio 315 is outside payload controller 309 and that radio 312 is internal to payload controller 309. In some embodiments, communication subsystem 112 may only detect radio 312 as there may be no electric/electronic connections between the payload controller and the vehicle controller. Thus, radio 315 may be undetectable for the payload controller.

Communication subsystem 112 may then configure the second communication device for receiving restricted payload execution commands to be executed using the restricted payload (e.g., kinetic payload). For example, communication subsystem 112 may configure radio 312 for receiving restricted payload execution commands. In some embodiments, instead of or in addition to configuring the second communication device (e.g., radio 312) for receiving restricted payload execution commands, communication subsystem 112 may configure the second communication device to receive other privileged commands. For example, a privileged command may be a self-destruct command or another suitable privileged command. The configuration may include establishing a wireless connection (e.g., via radio 312) with an operator radio over a particular set of frequencies.

When communication subsystem 112 configures the second communication device (e.g., radio 312), restricted command processing subsystem 118 may be configured to process those commands received by the radio. Thus, in response to receiving a restricted payload execution command for the restricted payload, restricted command processing subsystem 118 may engage a motor controller of the restricted payload to execute the restricted payload execution command. Restricted command processing subsystem 118 may include software components, hardware components, or a combination of both. For example, restricted command processing subsystem 118 may include software components that access data in memory and/or storage and may use one or more processors to perform its operations.

In some embodiments, payload controller 309 may receive a restricted payload execution command via radio 312. For example, the restricted payload execution command may be a command to fire a weapon or to release an explosive device. Both unrestricted command processing subsystem 116 and restricted command processing subsystem 118 may be hosted on a microcontroller (e.g., microcontroller 318). Thus radio 312 may be used to receive the command and pass the command to microcontroller 318. Microcontroller 318 may then identify the command (e.g., a command to fire a weapon) and provide the command to a motor controller (e.g., motor controller 321). The motor controller may engage the motor to execute the command (e.g., depress a trigger or perform another suitable mechanical operation).

In some embodiments, communication subsystem 112 may configure the payload controller by generating an appropriate command. In particular, in response to determining that the payload is the restricted payload, communication subsystem 112 may generate and provide, to the communication system associated with the uncrewed vehicle, a second command to establish the connection for receiving restricted payload execution commands over a second channel that is not used for executing the vehicle control commands. For example, the command may instruct radio 312 to establish a connection with an operator for receiving restricted payload execution commands.

In some embodiments, payload controller 309 may use the same radio onboard the uncrewed vehicle to receive restricted payload execution commands while maintaining air gap separation between the vehicle controller and the payload controller. The payload controller may achieve this result using various mechanisms. For example, the payload controller may wirelessly link radios 312 and 315 such that commands for the restricted payload may be sent wirelessly between the two radios with only one radio communicating with the operator. In another example, the payload controller may be equipped with an optical coupler or another suitable wireless connection to wirelessly connect with the vehicle controller. Thus, using the optical coupler, the payload controller may use the radio onboard the uncrewed vehicle (e.g., radio 315) to communicate with the operator. That is, the signals may travel from the payload controller to the vehicle controller through the optical coupler.

As discussed above, payload management system 102 may configure the vehicle's radio (e.g., radio 315) for receiving restricted payload execution commands. In particular, communication subsystem 112 may configure, within the communication system, a communication device for receiving the vehicle control commands over the first channel comprising a first set of frequencies and the restricted payload execution commands to be executed by the restricted payload over the second channel comprising a second set of frequencies. In some embodiments, the first channel may be encrypted differently from the second channel. For example, communication subsystem 112 may configure a particular set (e.g., one or more) radio frequencies for receiving restricted payload execution commands.

In one example, the payload controller (e.g., via communication subsystem 112) may setup an encryption protocol between the operator's device and the microcontroller (e.g., microcontroller 318) for receiving commands via radio 315. In particular, when a restricted payload execution command is received by radio 315, that command may be routed to the payload controller (e.g., via an optical coupler or another suitable wireless device). The received restricted payload execution command may then be decrypted using microcontroller 318. Thus, in response to receiving a restricted payload execution command over the second channel, restricted command processing subsystem 118 may decrypt the restricted payload execution command and engage a motor controller of the restricted payload to execute the restricted payload execution command (e.g., fire a weapon).

In some embodiments, payload detection subsystem 114 may receive a message (e.g., from radio 312 and/or radio 315) that the connection has been established. In particular, the microcontroller 318 may receive, from the communication system, an indication that the connection has been established. The indication may signal that the payload controller is now configured to receive payload commands. Thus, the payload controller may receive, from the communication system, a payload command for the restricted payload. For example, the payload controller may receive a command and determine (e.g., based on the mode that the payload controller is operating in) whether the command is a restricted payload execution command or an unrestricted payload execution command. If the payload controller determines that the command is a restricted payload execution command, the payload controller may execute the command. Thus, based on the payload command, the payload controller may execute the payload command using the restricted payload.

Figure 4:
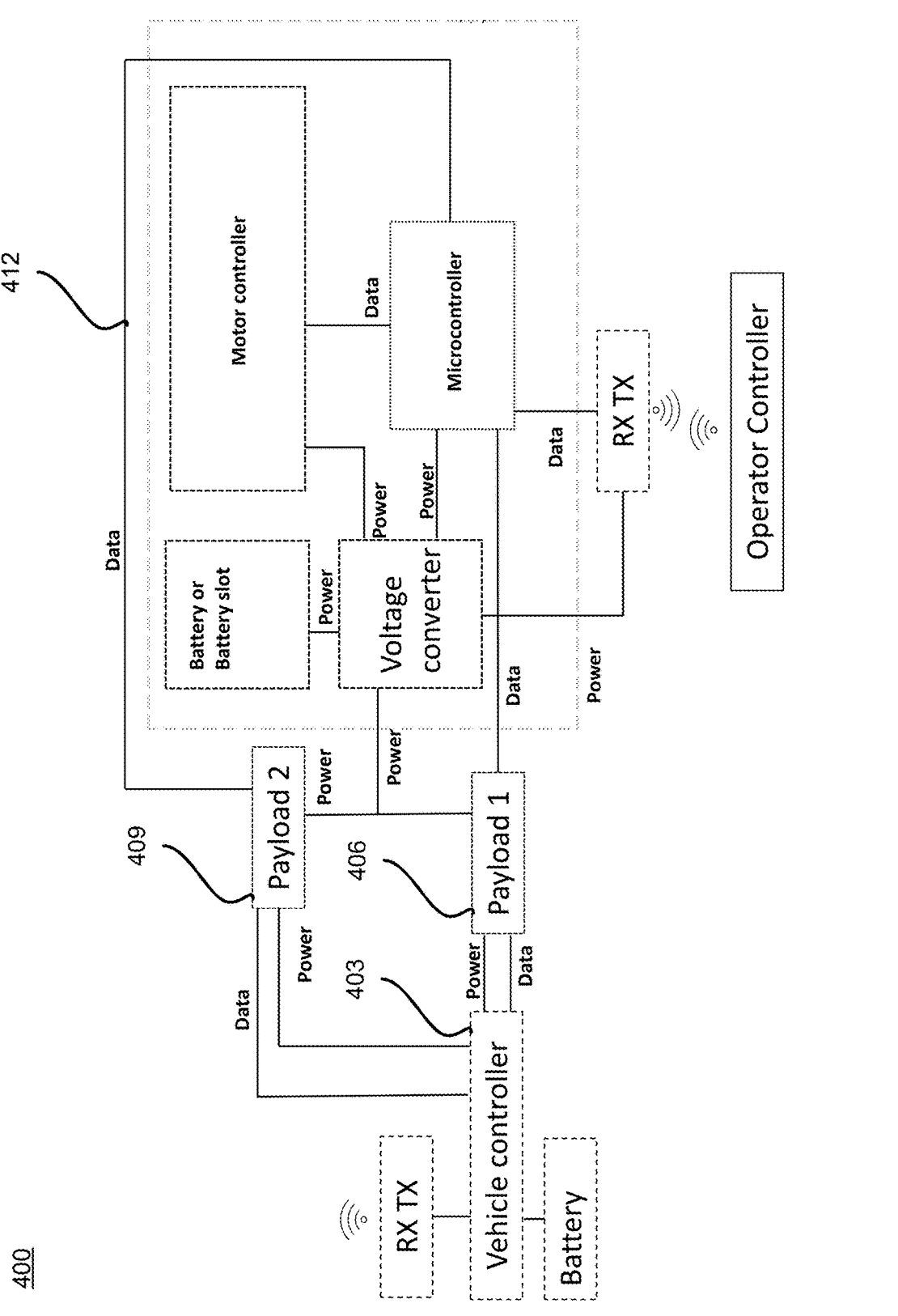
FIG. 4 illustrates a diagram for a connection of two unrestricted payloads, in accordance with one or more embodiments of this disclosure.

In some embodiments, a single payload controller may support multiple payloads. However, those multiple payloads must be of either all restricted payloads or all non-restricted payloads. FIG. 4 illustrates a diagram 400 that includes a vehicle controller 403 payload 406, payload 409 and payload controller 412. Both payloads shown are non-restricted payloads. Payload management system 102 may use the following operations to configure multiple payloads on a single payload controller. Payload management system 102 may detect that a second payload has been attached to the uncrewed vehicle. In some embodiments, the payload that was earlier attached to the payload controller may have been a non-restricted payload. For example, payload management system 102 may detect a new connection and retrieve an indication of the type of payload of the already connected payload. The indication may be stored in memory. Payload management system 102 may then determine that the second payload is a different unrestricted payload (e.g., a different non-kinetic payload). For example, payload management system 102 may make the determination as described above (e.g., based on signals from a physical switch such as solenoid switch, optical signals from an optical coupler, and/or based on another factor).

In some embodiments, the second payload may be a restricted payload. In the instance that the second payload is a restricted payload, payload management system 102 may generate an error message that the second payload cannot be managed by the payload controller. In this case, payload management system 102 may determine whether there is another payload controller available, and if so, payload management system 102 may generate a message to connect the second payload to the second payload controller. The message may be presented to an operator via a screen or sent to an operator's device. In some embodiments, an uncrewed vehicle may include two or more payload controllers. A first payload controller may be dedicated to restricted payloads while a second controller may be dedicated to unrestricted payloads. Accordingly, when payload management system 102 detects a new payload, payload management system 102 may determine whether a particular payload controller is able to manage a particular payload. In some embodiments, an uncrewed vehicle may have several payload connections or payload slots. Each one may be paired with a payload controller. Thus, payload management system 102 may configure each connection or slot to pair with a particular payload controller based on the type of payload (e.g., kinetic or non-kinetic). For example, payload management system 102 may include a physical mechanism for moving connections to pair payloads with payload controllers.

In some embodiments, where the second payload is an unrestricted payload, payload management system 102 may generate a command to enable a power connection and a data connection between the second payload and the uncrewed vehicle. For example, payload management system 102 may control a solenoid switch, pins, and/or an optical coupler to perform this operation.

In some embodiments, payload management system 102 may detect that a third payload has been attached to the uncrewed vehicle. As described above, payload management system 102 may detect when a particular payload is connected. In some embodiments, when a payload is connected to the payload controller, the payload may send an identification signal to the payload controller identifying itself as a restricted payload or an unrestricted payload. Thus, payload management system 102 may determine that the third payload is a different restricted payload (e.g., via detect mechanisms described above). Payload management system 102 may then cause the different restricted payload to be managed using a different payload controller. For example, as described above, the different payload controller may be a second payload controller associated with the uncrewed vehicle.

Computing Environment

Figure 5:
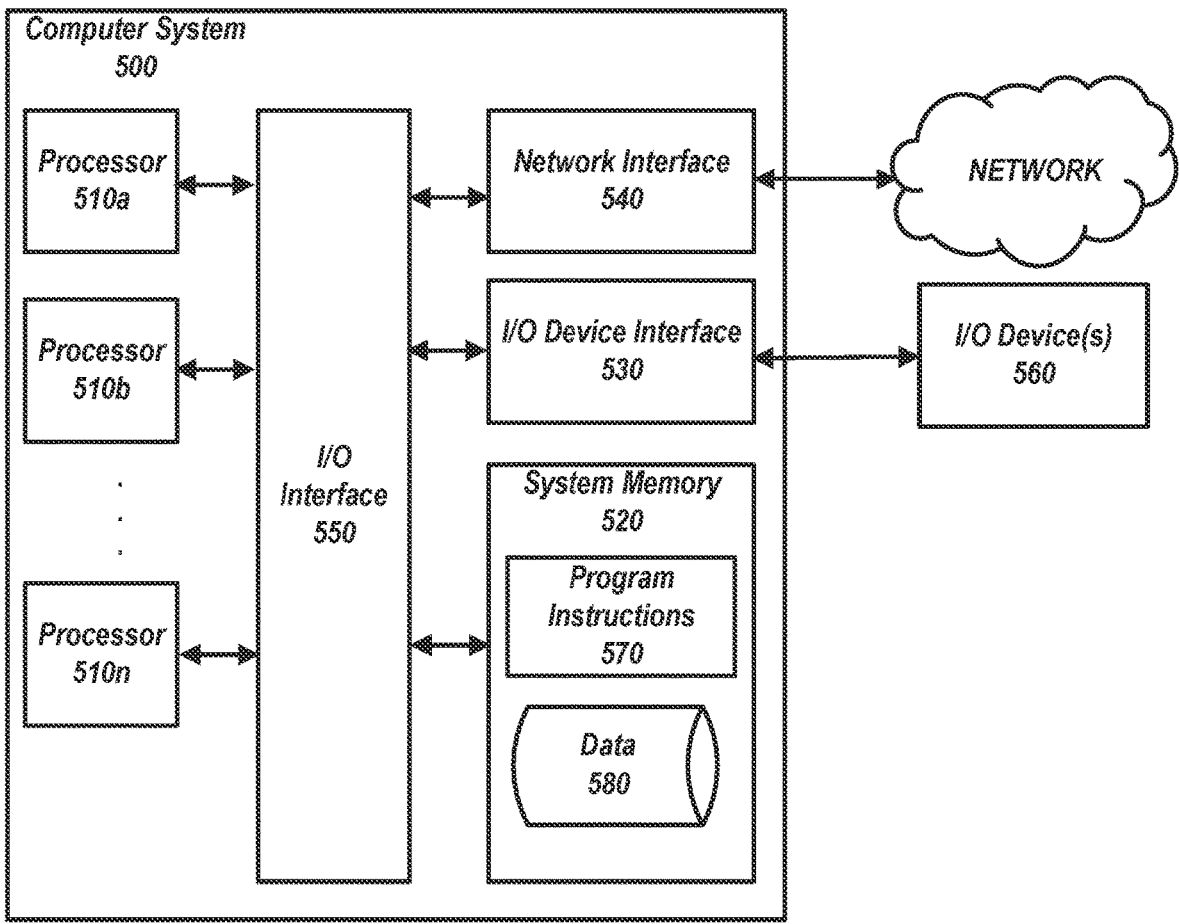
FIG. 5 illustrates a computing device that may be used as a microcontroller, in accordance with one or more embodiments of this disclosure.

FIG. 5 shows an example computing system that may be used in accordance with some embodiments of this disclosure. In some instances, computing system 500 is referred to as a computer system. The computing system may be hosted on a controller (e.g., a vehicle controller, a payload controller, and/or within a microcontroller) that an operator may control. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uniprocessor system including one processor (e.g., processor 510a), or a multiprocessor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated, or it may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

FIG. 6 is a flowchart 600 of operations for generating composite frames of objects detected in multiple different types of data streams. The operations of FIG. 6 may use components described in relation to FIG. 5. In some embodiments, payload management system 102 may include one or more components of computing system 500. At 602, payload management system 102 detects that a payload has been attached (e.g., to an uncrewed vehicle). For example, payload management system 102 may use processor 510*a*, 510*b*, and/or 510*n* which may be part of the microcontroller hosted by the payload controller to perform this operation.

At 604, payload management system 102 determines, based on an electronic signal from the payload, whether the payload is a restricted payload or an unrestricted payload. For example, payload management system 102 may use processor 510*a*, 510*b*, and/or 510*n*, which may be part of the microcontroller hosted by the payload controller to perform this operation. In some embodiments, payload management system 102 may store the result of the determination in system memory 520.

At 606, payload management system 102, based on determining that the payload is the unrestricted payload, establishes a connection for receiving unrestricted payload execution commands over a first channel used for executing vehicle control commands. For example, payload management system 102 may use processor 510*a*, 510*b*, and/or 510*n*, which may be part of the microcontroller hosted by the payload controller to perform this operation. In some embodiments, payload management system 102 may store the result of the determination in system memory 520.

At 608, payload management system 102, based on determining that the payload is the restricted payload, establishes the connection for receiving restricted payload execution commands over a second channel that is not used for executing the vehicle control commands. For example, payload management system 102 may use processor 510*a*, 510*b*, and/or 510*n*, which may be part of the microcontroller hosted by the payload controller to perform this operation. In some embodiments, payload management system 102 may store the result of the determination in system memory 520.

At 610, payload management system 102, based on receiving, from the communication system, a payload command for the restricted payload, executes the payload command using the restricted payload. For example, payload management system 102 may use processor 510*a*, 510*b*, and/or 510*n*, which may be part of the microcontroller hosted by the payload controller to perform this operation.

In some embodiments, payload management system 102 may store the result of the determination in system memory 520.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: detecting, using a payload controller, that a payload has been attached to an uncrewed vehicle, wherein the payload comprises additional equipment carried by the uncrewed vehicle; determining, based on an electronic signal from the payload, whether the payload is a restricted payload or an unrestricted payload; in response to determining that the payload is the-unrestricted payload, generating and providing, to a communication system associated with the uncrewed vehicle, a first command to establish a connection for receiving unrestricted payload execution commands over a first channel used for executing vehicle control commands; in response to determining that the payload is the restricted payload, generating and providing, to the communication system associated with the uncrewed vehicle, a second command to establish the connection for receiving restricted payload execution commands over a second channel that is not used for executing the vehicle control commands; and based on receiving, from the communication system, a payload command for the restricted payload, executing the payload command using the restricted payload.

2. Any of the preceding embodiments, further comprising: detecting, within the communication system, a first communication device and a second communication device attached to the uncrewed vehicle, wherein the first communication device is used for vehicle control; configuring the second communication device for receiving the restricted payload execution commands to be executed using the restricted payload; and in response to receiving a restricted payload execution command for the restricted payload, engaging a motor controller of the restricted payload to execute the restricted payload execution command.

3. Any of the preceding embodiments, further comprising: configuring, within the communication system, a communication device for receiving the vehicle control commands over the first channel comprising a first set of frequencies and the restricted payload execution commands to be executed by the restricted payload over the second channel comprising a second set of frequencies, wherein the first channel is encrypted differently from the second channel; and in response to receiving a restricted payload execution command over the second channel, decrypting the restricted payload execution command and engaging a motor controller of the restricted payload to execute the restricted payload execution command.

4. Any of the preceding embodiments, further comprising: detecting that a second payload has been attached to the uncrewed vehicle, wherein the payload is the non-restricted payload; determining that the second payload is a different unrestricted payload; generating a command to enable a power connection and a data connection between the second payload and the uncrewed vehicle; detecting that a third payload has been attached to the uncrewed vehicle; determining that the third payload is a different restricted payload; and causing the different restricted payload to be managed using a different payload controller.

5. Any of the preceding embodiments, wherein determining whether the payload is the restricted payload or the unrestricted payload further comprises: receiving the electronic signal via a solenoid switch, wherein the electronic signal is generated using power from a first power source associated with the uncrewed vehicle and not from a second power source associated with the payload controller; and based on the electronic signal being generated using the first power source, determining that the payload is the unrestricted payload.

6. Any of the proceeding embodiments, wherein determining whether the payload is the restricted payload or the unrestricted payload further comprises: receiving the electronic signal via a pin of a plurality of pins, wherein the plurality of pins is used for power transfer and signal transfer between the payload controller and the uncrewed vehicle, and wherein the pin of the plurality of pins is preconfigured for use with unrestricted payloads; and based on the electronic signal received via the pin of the plurality of pins, determining that the payload is the unrestricted payload.

7. Any of the preceding embodiments, wherein determining whether the payload is the restricted payload or the unrestricted payload further comprises: receiving no electronic signal via a solenoid switch; and based on lack of the electronic signal being received via the solenoid switch, determining that the payload is the restricted payload.

8. A tangible, non-transitory, machine-readable medium storing instructions that, when executed by a data processing apparatus, cause the data processing apparatus to perform operations comprising those of any of embodiments 1-7.

9. A system comprising: one or more processors; and memory storing instructions that, when executed by the processors, cause the processors to effectuate operations comprising those of any of embodiments 1-7.

10. A system comprising means for performing any of embodiments 1-7.

11. A system comprising cloud-based circuitry for performing any of embodiments 1-7.

What is claimed is:

1. A system for automatically configuring uncrewed vehicle payloads, the system comprising:
one or more processors; and
one or more non-transitory, computer-readable storage media storing instructions that, when executed by the one or more processors, cause the one or more processors to perform operations comprising:
detecting, using a payload controller, that a payload has been attached to an uncrewed vehicle, wherein the payload comprises additional equipment carried by the uncrewed vehicle;
determining, based on receiving a signal associated with the payload being attached, whether the payload is a kinetic payload or a non-kinetic payload, wherein the kinetic payload comprises a projectile mechanism and the non-kinetic payload comprises a non-projectile mechanism;
in response to determining that the payload is the non-kinetic payload, generating and providing, to a communication system associated with the uncrewed vehicle, a first command to establish a connection for receiving non-kinetic payload execution commands over a first channel used for executing vehicle control commands;
in response to determining that the payload is the kinetic payload, generating and providing, to the communication system associated with the uncrewed vehicle, a second command to establish the connection for receiving kinetic payload execution commands over a second channel that is not used for executing the vehicle control commands;
receiving, from the communication system, an indication that the connection has been established;
receiving, from the communication system, a payload command for the kinetic payload; and
based on the payload command, executing the payload command using the kinetic payload.

2. The system of claim 1, wherein the instructions further cause the one or more processors to perform operations comprising:
detecting, within the communication system, a first communication device and a second communication device attached to the uncrewed vehicle, wherein the first communication device is used for vehicle control;
configuring the second communication device for receiving the kinetic payload execution commands to be executed using the kinetic payload; and
in response to receiving a kinetic payload execution command for the kinetic payload, engaging a motor controller of the kinetic payload to execute the kinetic payload execution command.

3. The system of claim 1, wherein the instructions further cause the one or more processors to perform operations comprising:
configuring, within the communication system, a communication device for receiving the vehicle control commands over the first channel comprising a first set of frequencies and the kinetic payload execution commands to be executed by the kinetic payload over the second channel comprising a second set of frequencies, wherein the first channel is encrypted differently from the second channel; and
in response to receiving a kinetic payload execution command over the second channel, decrypting the kinetic payload execution command and engaging a motor controller of the kinetic payload to execute the kinetic payload execution command.

4. The system of claim 1, wherein the instructions further cause the one or more processors to perform operations comprising:

detecting that a second payload has been attached to the uncrewed vehicle, wherein the payload is the non-kinetic payload;

determining that the second payload is a different non-kinetic payload;

generating a command to enable a power connection and a data connection between the second payload and the uncrewed vehicle;

detecting that a third payload has been attached to the uncrewed vehicle;

determining that the third payload is a different kinetic payload; and causing the different kinetic payload to be managed using a different payload controller.

5. The system of claim 1, wherein the instructions for determining whether the payload is the kinetic payload or the non-kinetic payload further cause the one or more processors to perform operations comprising:

receiving the signal via a solenoid switch, wherein the signal is generated using power from a first power source associated with the uncrewed vehicle and not from a second power source associated with the payload controller; and based on the signal being generated using the first power source, determining that the payload is the non-kinetic payload.

6. The system of claim 1, wherein the instructions for determining whether the payload is the kinetic payload or the non-kinetic payload further cause the one or more processors to perform operations comprising:

receiving the signal via a pin of a plurality of pins, wherein the plurality of pins is used for power transfer and signal transfer between the payload controller and the uncrewed vehicle, and wherein the pin of the plurality of pins is preconfigured for use with non-kinetic payloads; and based on the signal received via the pin of the plurality of pins, determining that the payload is the non-kinetic payload.

7. The system of claim 1, wherein the instructions for determining whether the payload is the kinetic payload or the non-kinetic payload further cause the one or more processors to perform operations comprising:

receiving no electronic signal via a solenoid switch; and based on lack of the signal being received via the solenoid switch, determining that the payload is the kinetic payload.

8. A method comprising:

detecting, using a payload controller, that a payload has been attached to an uncrewed vehicle, wherein the payload comprises additional equipment carried by the uncrewed vehicle;

determining, based on detecting a signal associated with the payload, whether the payload is a restricted payload or an unrestricted payload;

in response to determining that the payload is the unrestricted payload, generating and providing, to a communication system associated with the uncrewed vehicle, a first command to establish a connection for receiving unrestricted payload execution commands over a first channel used for executing vehicle control commands;

in response to determining that the payload is the restricted payload, generating and providing, to the communication system associated with the uncrewed vehicle, a second command to establish the connection for receiving restricted payload execution commands over a second channel that is not used for executing the vehicle control commands; and based on receiving, from the communication system, a payload command for the restricted payload, executing the payload command using the restricted payload.

9. The method of claim 8, further comprising:

detecting, within the communication system, a first communication device and a second communication device attached to the uncrewed vehicle, wherein the first communication device is used for vehicle control;

configuring the second communication device for receiving the restricted payload execution commands to be executed using the restricted payload; and in response to receiving a restricted payload execution command for the restricted payload, engaging a motor controller of the restricted payload to execute the restricted payload execution command.

10. The method of claim 8, further comprising:

configuring, within the communication system, a communication device for receiving the vehicle control commands over the first channel comprising a first set of frequencies and the restricted payload execution commands to be executed by the restricted payload over the second channel comprising a second set of frequencies, wherein the first channel is encrypted differently from the second channel; and in response to receiving a restricted payload execution command over the second channel, decrypting the restricted payload execution command and engaging a motor controller of the restricted payload to execute the restricted payload execution command.

11. The method of claim 8, further comprising:

detecting that a second payload has been attached to the uncrewed vehicle, wherein the payload is the unrestricted payload;

determining that the second payload is a different unrestricted payload;

generating a command to enable a power connection and a data connection between the second payload and the uncrewed vehicle;

detecting that a third payload has been attached to the uncrewed vehicle;

determining that the third payload is a different restricted payload; and causing the different restricted payload to be managed using a different payload controller.

12. The method of claim 8, wherein determining whether the payload is the restricted payload or the unrestricted payload further comprises:

receiving the signal, wherein the signal is generated using power from a first power source associated with the uncrewed vehicle and not from a second power source associated with the payload controller; and based on the signal being generated using the first power source, determining that the payload is the unrestricted payload.

13. The method of claim 8, wherein determining whether the payload is the restricted payload or the unrestricted payload further comprises:

receiving the signal via a pin of a plurality of pins, wherein the plurality of pins is used for power transfer and signal transfer between the payload controller and the uncrewed vehicle, and wherein the pin of the plurality of pins is preconfigured for use with unrestricted payloads; and based on the signal received via the pin of the plurality of pins, determining that the payload is the unrestricted payload.

14. The method of claim 8, wherein determining whether the payload is the restricted payload or the unrestricted payload further comprises:

receiving no signal via a solenoid switch; and based on lack of the signal being received via the solenoid switch, determining that the payload is the restricted payload.

15. One or more non-transitory, computer-readable media storing instructions thereon, wherein the instructions cause one or more processors to perform operations comprising:

detecting, using a payload controller, that a payload has been attached to an uncrewed vehicle, wherein the payload comprises additional equipment carried by the uncrewed vehicle;

determining, based on receiving a signal associated with the payload, whether the payload is a restricted payload or an unrestricted payload;

in response to determining that the payload is the unrestricted payload, establishing a connection for receiving unrestricted payload execution commands over a first channel that is used for executing vehicle control commands;

in response to determining that the payload is the restricted payload, establishing the connection for receiving restricted payload execution commands over a second channel that is not used for executing the vehicle control commands; and based on receiving a payload command for the restricted payload, executing the payload command using the restricted payload.

16. The one or more non-transitory, computer-readable media of claim 15, wherein the instructions further cause the one or more processors to perform operations comprising:

detecting, within a communication system associated with the uncrewed vehicle, a first communication device and a second communication device attached to the uncrewed vehicle, wherein the first communication device is used for vehicle control;

configuring the second communication device for receiving the restricted payload execution commands to be executed using the restricted payload; and in response to receiving a restricted payload execution command for the restricted payload, engaging a motor controller of the restricted payload to execute the restricted payload execution command.

17. The one or more non-transitory, computer-readable media of claim 15, wherein the instructions further cause the one or more processors to perform operations comprising:

configuring, within a communication system associated with the uncrewed vehicle, a communication device for receiving the vehicle control commands over the first channel comprising a first set of frequencies and the restricted payload execution commands to be executed by the restricted payload over the second channel comprising a second set of frequencies, wherein the first channel is encrypted differently from the second channel; and in response to receiving a restricted payload execution command over the second channel, decrypting the restricted payload execution command and engaging a motor controller of the restricted payload to execute the restricted payload execution command.

18. The one or more non-transitory, computer-readable media of claim 15, wherein the instructions further cause the one or more processors to perform operations comprising:

detecting that a second payload has been attached to the uncrewed vehicle, wherein the payload is the unrestricted payload;

determining that the second payload is a different unrestricted payload;

generating a command to enable a power connection and a data connection between the second payload and the uncrewed vehicle;

detecting that a third payload has been attached to the uncrewed vehicle;

determining that the third payload is a different restricted payload; and causing the different restricted payload to be managed using a different payload controller.

19. The one or more non-transitory, computer-readable media of claim 15, wherein the instructions for determining whether the payload is the restricted payload or the unrestricted payload further cause the one or more processors to perform operations comprising:

receiving the signal via a solenoid switch, wherein the signal is generated using power from a first power source associated with the uncrewed vehicle and not from a second power source associated with the payload controller; and based on the signal being generated using the first power source, determining that the payload is the unrestricted payload.

20. The one or more non-transitory, computer-readable media of claim 15, wherein the instructions for determining whether the payload is the restricted payload or the unrestricted payload further cause the one or more processors to perform operations comprising:

receiving the signal via a pin of a plurality of pins, wherein the plurality of pins is used for power transfer and signal transfer between the payload controller and the uncrewed vehicle, and wherein the pin of the plurality of pins is preconfigured for use with unrestricted payloads; and based on the signal received via the pin of the plurality of pins, determining that the payload is the unrestricted payload.

* * * * *